United States Patent [19]
Roncato

[11] 3,945,280
[45] Mar. 23, 1976

[54] APPARATUS FOR CUTTING THREAD

[75] Inventor: Giordano Roncato, Aix-les-Bains, France

[73] Assignee: Saint-Gobain Industries, Neuilly-sur-Seine, France

[22] Filed: Mar. 21, 1973

[21] Appl. No.: 343,205

[30] Foreign Application Priority Data
Mar. 24, 1972 France .................. 72.10335

[52] U.S. Cl. .............. 83/98; 83/116; 83/123; 83/132; 83/138
[51] Int. Cl.² ............................. B26D 7/18
[58] Field of Search ......... 83/98, 99, 100, 112, 115, 83/123, 124, 132, 141, 142, 129, 134, 136, 138, 116

[56] References Cited
UNITED STATES PATENTS

| | | | |
|---|---|---|---|
| 2,496,468 | 2/1950 | Hanson | 83/141 X |
| 2,729,028 | 1/1956 | Slayter et al. | 83/98 X |
| 2,745,491 | 5/1956 | Sonneborn et al. | 83/98 |
| 3,130,619 | 4/1964 | Faro | 83/98 |
| 3,217,575 | 11/1965 | Anetsberger | 83/115 |
| 3,269,235 | 8/1966 | Crouch et al. | 83/99 |
| 3,322,037 | 5/1967 | Cavagnero | 83/100 X |
| 3,353,431 | 11/1967 | Mylo | 83/116 |
| 3,555,947 | 1/1971 | Fram | 83/116 |
| 3,733,945 | 5/1973 | Cook | 83/99 X |

*Primary Examiner*—Willie G. Abercrombie
*Attorney, Agent, or Firm*—Synnestvedt & Lechner

[57] ABSTRACT

A method and apparatus for cutting threads, particularly threads formed of mineral substances such as glass, are disclosed. A rotating drum carrying a plurality of radially extending cutting blades operates in conjunction with a rotating support drum which carries and supports the thread for cutting by the cutting blades. Ejector elements carried by the cutting drum and positioned in the spaces between the cutting blades are urged radially outwardly by centrifugal force and compress the thread against the surface of the support drum. The ejector elements then serve to strip cut sections of the thread from between the blades as the cutting blades move away from the support drum. Compressed air is supplied to the spaces between the cutting blades to remove waste material resulting from the cutting operation.

12 Claims, 13 Drawing Figures

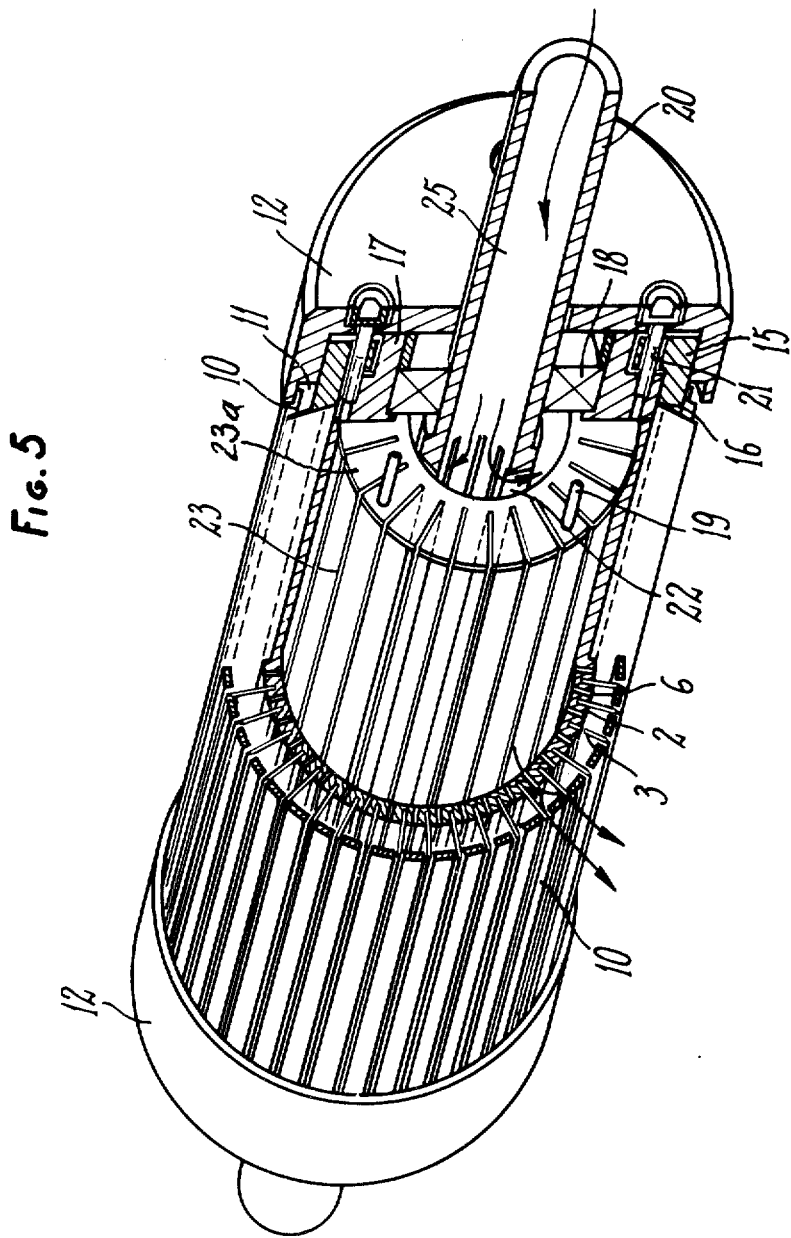

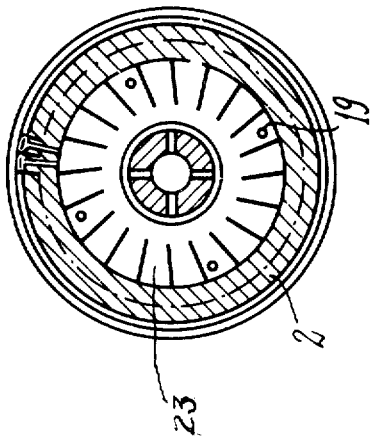
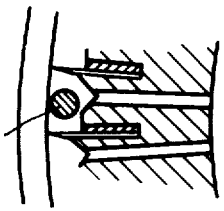
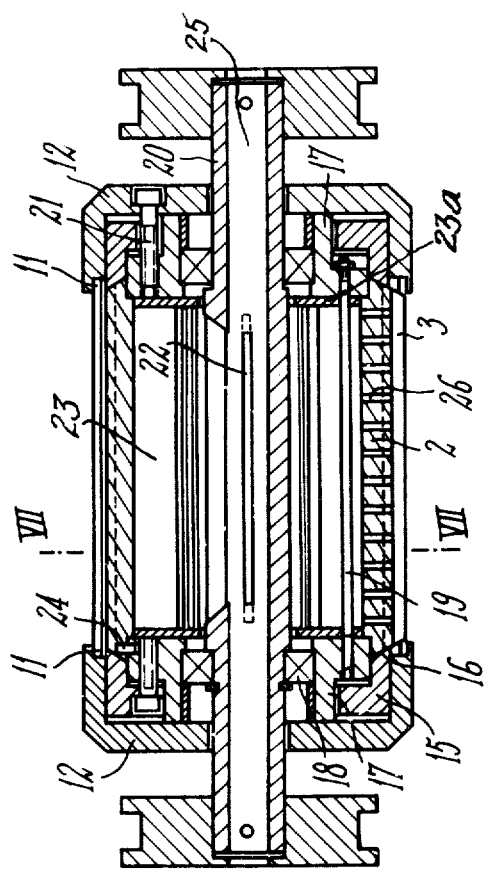
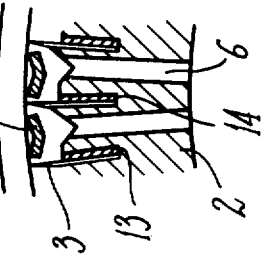
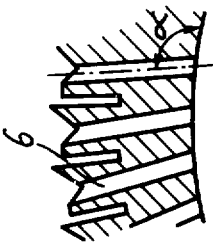

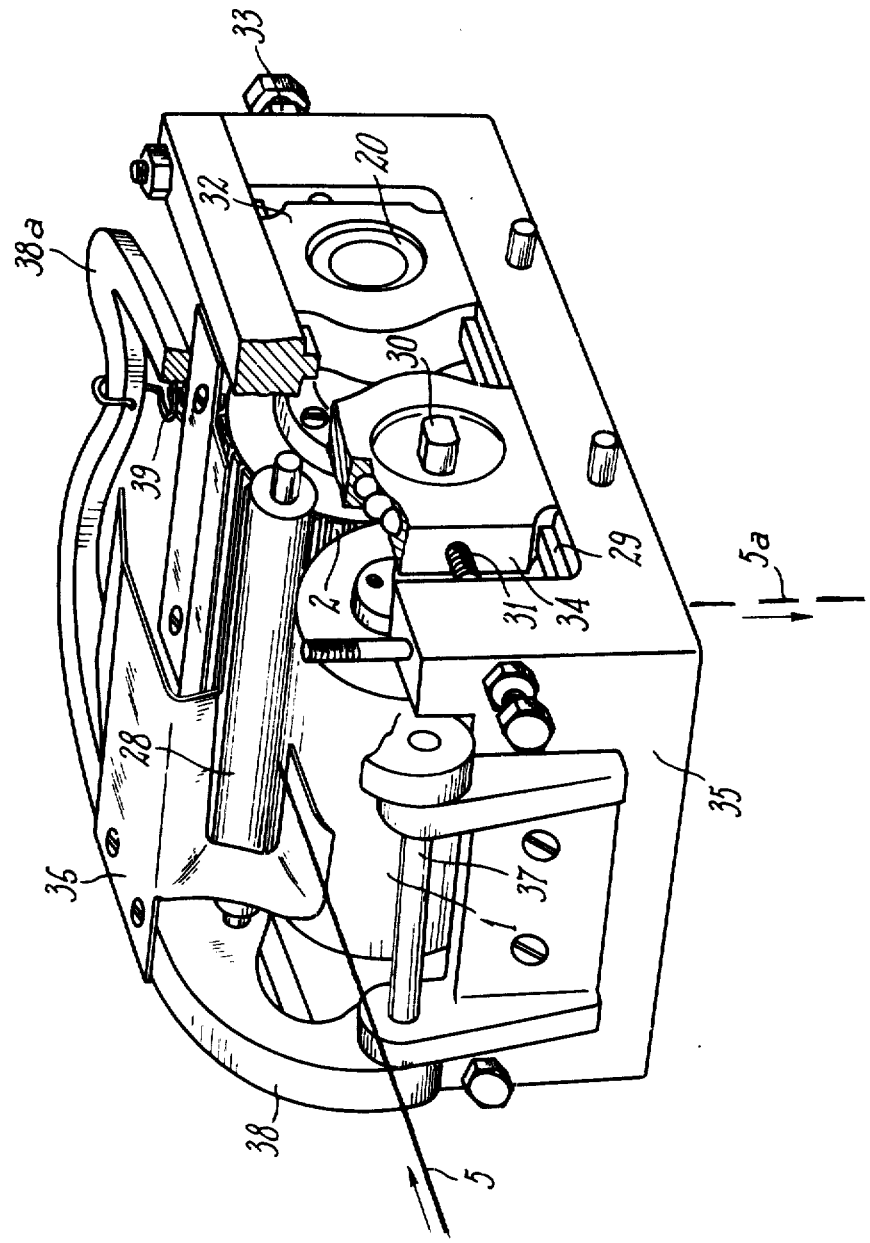

APPARATUS FOR CUTTING THREAD

BACKGROUND OF THE INVENTION

1. Field of the Invention

This invention relates to cutting threads into short sections, particularly threads in the form of rovings of untwisted or slightly twisted strands of a mineral substance such as glass fibers.

Short pieces of glass fiber rovings, usually in lengths between three to 6 millimeters have been found to be useful as a reinforcement material in synthetic polymeric resins which are cast or molded into complex shapes. Rovings possess relatively little cohesion, and as a consequence, the individual strands of which they are constituted tend to separate during the cutting operation in which the pieces are cut from a continuous length of roving. This results in the formation of a considerable quantity of waste material in the form of fibers and particles which, as the cutting operation proceeds, tends to fill and to be packed into the spaces between cutting blades carried by a rotating cutting drum, and this tends to make the cutting process faulty.

2. Description of the Prior Art

It has been known to cut rovings into short lengths by the use of a rotating drum having radially extending cutting blades, which drum acts in conjunction with a rotating support drum; the rovings being carried on the support drum and being cut by the blades as the blades come into contact with the surface of the support drum.

U.S. Pat. No. 3,555,947 shows such roving cutting apparatus employing means for ejecting the cut pieces from between adjacent cutting blades. In that device, a drum formed of a plurality of ejecting bars is mounted for rotation eccentrically with respect to the axis of rotation of the drum to which the cutting blades are attached. Ejection of the cuttings is confined to a very narrow area immediately adjacent the point of cutting. Further, this device has no means for preventing the waste material resulting from the cutting action from accumulating in the spaces between the blades. The buildup of waste material between the blades can be quite considerable, particularly where short lengths are being cut, and it is difficult to remove because of the formation of electrostatic fields which tend to cause the waste material to be retained in the spaces between the cutting blades.

SUMMARY OF THE INVENTION

The purpose of this invention is to provide a method and means for accurately and reliably producing short length cuttings, reliably and completely ejecting the cuttings from cutting drum, and inhibiting the collection of waste material between the cutting blades.

In the process according to the invention, rovings are carried by a supporting device to a primary zone in the immediate vicinity of cutting elements, and while in the primary zone, are compressed against the surface of the supporting element. This facilitates the process of ejecting the cut piece and also improves the cutting process. After the roving is cut, it is carried to a secondary zone where the cut pieces are ejected from the cutting element by the action of ejector elements which are driven radially outwardly by centrifugal force. The formation of waste between the blades is inhibited by supplying a compressed gas, for instance air, to the spaces between the cutting blades.

Apparatus for carrying out the method set forth above includes a supporting element comprised of a rotatable drum, and a cutting element comprised of a second drum which is rotatable about an axis parallel to the axis of rotation of the support drum and which is provided with a plurality of radially outwardly extending cutting blades. Ejector elements are located between the cutting blade and are movable radially outwardly by the centrifugal force developed by the rotating drum. The ejector elements compress the rovings against the surface of the supporting drum and strip the cut pieces from the spaces between the cutting blades.

The cutting drum is provided with slots or channels through which compressed air may pass from the interior of the drum outwardly through the spaces between the cutting blades, thereby dislodging and carrying away fibers and particles accumulating in the interblade spaces.

In a particularly advantageous embodiment of apparatus, the ejector elements are comprised of plates or rods fastened to the cutting drum at their two ends but unattached at the center, the central section thereof being displaced radially outwardly by the action of centrifugal forces developed by the rotation of the cutting drum.

According to one embodiment of the invention, compressed air that inhibits the accumulation of waste in the spaces between blades is supplied through a hollow shaft about which the cutting drum rotates. The hollow shaft is supplied with longitudinal slots for supplying compressed air to the interior of the drum.

In another embodiment of the invention, the cutting drum carries a blower that produces compressed air which is in turn supplied to the spaces between the cutting blades.

Other characteristics and advantages of the invention will become evident from a consideration of the detailed description of several embodiments that follows, which description is given by way of example and not intended to limit the scope of the invention.

DESCRIPTION OF THE PREFERRED EMBODIMENTS

FIG. 5 is a perspective view of one embodiment of a cutting drum assembly having an internal blower and slots for supplying compressed air to the spaces between cutting blades, some parts being shown in section and some being broken away to disclose other parts within the drum assembly.

FIG. 6 is an axial sectional view of a cutting drum similar to that shown in FIG. 5, with the exception that the grooves in the drum for supplying air are replaced by space apertures.

FIG. 7 is a transverse sectional view taken as indicated by the line VII—VII of FIG. 6.

FIG. 8 is a detail view of a section of a cutting drum showing angularly disposed slots in the drum for supplying air to the spaces between cutting blades.

FIG. 9 is a detail view of a section of a cutting drum showing how cutting blades are installed on the drum.

FIG. 10 is a detail view of another embodiment which utilizes ejector elements comprised of rods having a circular cross section.

FIG. 11 is a perspective view, partially cut away, of an assembly comprising a cutting drum and a cooperating roving support drum mounted on a base.

Figure 1:
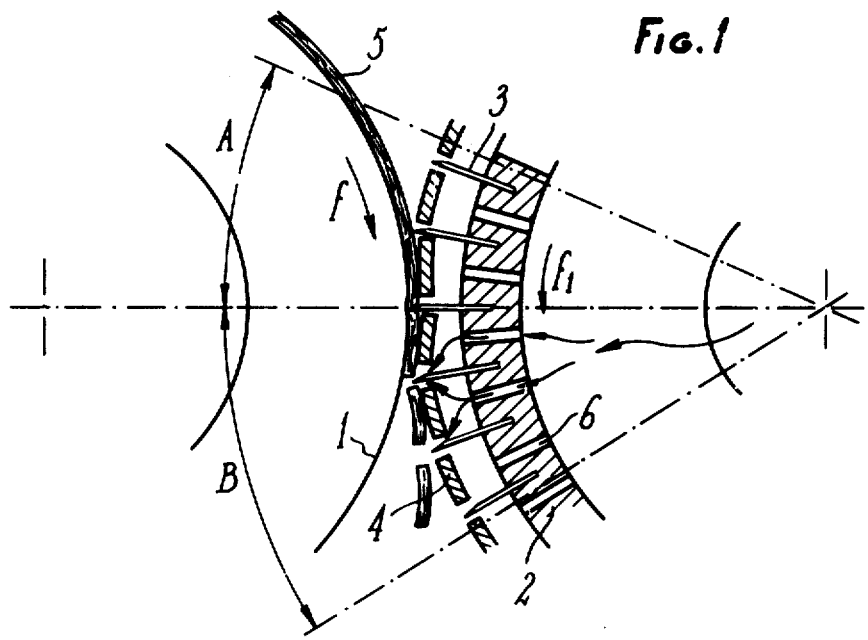
FIG. 1 is a partial schematic view showing the general layout of apparatus embodying the invention.

FIG. 1 is a schematic representation of a device for carrying out the process according to the invention which device is comprised of a supporting element or "anvil", which usually consists of a support or anvil drum 1, rotatable around an axis in the direction of the arrow $f$, and a cutting drum 2 that turns about an axis in the direction of the arrow $f_1$. The cutting drum has a plurality of radially extending cutting blades 3 mounted thereon and an ejector means that is comprised of a plurality of ejector elements such as plates 4. Each of the plates is located in a space between adjacent cutting blades and is fastened only at its two ends, and may be flexible so that when the cutting drum is at rest, the central portion of each plate is depressed and may be in contact with the surface of the drum 2. When the cutting drum is rotating at its normal speed, the central portions of plate 4 are urged radially outwardly by centrifugal force to the level of the cutting edges of the blades 3.

The rovings 5 are introduced into the apparatus and pass over the support drum 1. They first pass through a primary zone A where they are subjected to compression. This compression is produced by the plates 4 which press the rovings against the surface of the drum 1 by reason of the centrifugal force to which the plates are subjected by the rotation of the drum 2. The cutting blades cut the rovings into short sections, after which the cut sections pass into a secondary zone B, where the cut pieces are ejected and where the waste is eliminated by the passage of compressed air through slots 6 located in the drum 2, as will hereinafter be described in more detail.

Because of the action provided by the ejector plates 4, which are positioned between the blades 3 at the moment of cutting and which thereafter regain their outward position so that their surfaces are more or less at the level of the cutting edge of blades 3, the cut pieces are forcefully ejected from the cutting drum. This action is supplemented by the centrifugal forces acting on the cut pieces. Furthermore, the jets of compressed air issuing from the slots 6 inhibit the accumulation of any waste material.

Figure 2:
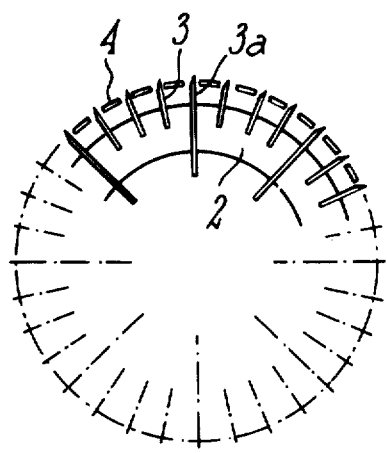
FIG. 2 is a schematic drawing of a cutting drum, some of the cutting blades of which are used to constitute a centrifugal blower.

Air at greater than atmospheric pressure can be obtained by making use of the rotation of the drum. For example, in FIG. 2, there is shown a cutting drum wherein some of the cutting blades 3a, are longer than the normal cutting blades 3 and constitute the vanes of a centrifugal blower. In this case, the drum 2 may not be slotted, and the compressed air passes directly between the cutting blades 3 and the ejector plates 4 to remove waste material.

Figure 3:
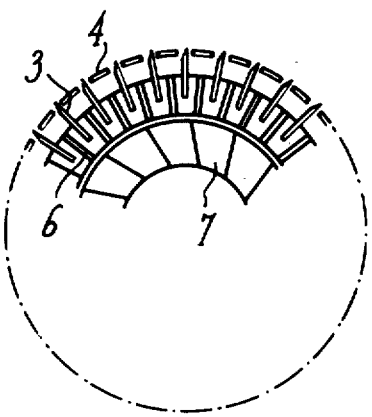
FIG. 3 is a schematic drawing of another form of cutting drum wherein a centrifugal blower is located inside the drum.

According to another arrangement shown in FIG. 3, a centrifugal blower 7 is provided inside the drum. The blower rotates with the drum and the compressed air issuing from the blower passes through the drum, via the slots 6, into the spaces between cutting blades 3.

The compressed air may also be supplied from outside the apparatus and may be introduced inside the drum 2 via the passage 25 in the hollow shaft 20 shown in FIG. 5. In this embodiment, a distributor (not shown) may be provided that directs the compressed air, so that it is concentrated on the zone where the cut pieces are ejected.

Figure 4:
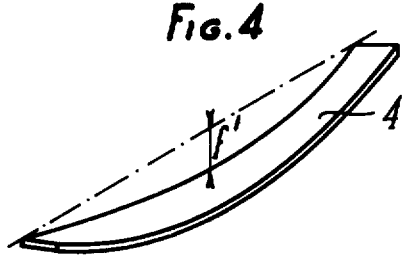
FIG. 4 is a detail view of an ejector element showing the element in a relaxed condition.

The ejector elements 4 may have any cross section that is suitable from the standpoint of mechanical strength. If the cross section of the ejector elements has a low moment of inertia in the direction in which the centrifugal force acts, such as the flat plates as shown in the foregoing FIGS. 1–4, it has been found to be advantageous to shape the ejector elements so that they have a longitudinal curvature as indicated by the arrow $f^1$ in FIG. 4. The degree of curvature is dependent on the desired speed of rotation of the cutting drum to which the ejector element is to be attached. Preferably, the curvature indicated by the arrow $f^1$ will then be neutralized and the ejector element will be substantially straight when the cutting drum has reached its normal operating speed.

It should be understood that the anvil drum 1 and the cutting drum 2 are driven by suitable drive means (not shown).

FIG. 5 is a view in perspective of one embodiment of a cutting drum according to the invention. In this figure and also in several of the other figures, the supporting drum or amvil 1 is not pictured. It should be realized that the drum 1 can be a cylindrical body of flexible material, for instance rubber, mounted on a shaft or may be a cylindrical drum coated or covered with a flexible material, such as rubber, both of such drums being types which are currently utilized for purpose herein disclosed.

In FIG. 5, the ejector elements comprising plates 10, are installed on the drum 2, on which are mounted the cutting blades 3, the ejector plates 10 being located in the spaces between the cutting blades. The plates 10 are held at their extremities inside grooves 11 of the covers 12, as shown in FIG. 5 and 6. The plates 10 are precluded from longitudinal movement by the covers 12, but are movable in a radial direction by the centrifugal forces arising from the rotation of drum 2. The depth of each space between the cutting blades corresponds to the height of the cutting blades 3 projecting beyond the surface of the drum 2, and the thickness of the ejector plates 10 in a radial direction is significantly less than this height. Thus plates 10 can sweep the entire depth of the space from the outer surface of the drum 2 to the cutting edges of the cutting blades 3.

As shown in FIGS. 6 and 9, the cutting blades 3, are mounted on the drum 2 in grooves 13 and are retained in the grooves by means of corrugated springs 14. The blades 3 are held at their ends by two flanges 15 having tapered projections 16. The wall of the drum 2 is traversed by grooves 6, which are positioned between each of the cutting blades and which are directed toward the ejector plates 10.

The drum 2 is cylindrical and is mounted for rotation about its axis by two flanges 17, which are rotatably mounted to a central shaft 20 by bearings such as ball bearings 18. The assembly comprised of the drum 2 and the flanges 17 is secured together by tie rods 19, and this assembly is attached to the covers 12 by bolts 21. The ball bearings 18 allow the assembly comprised of the drum 2, flanges 17 and covers 12 to turn freely in relation to the central shaft 20.

The shaft 20 has longitudinal slots 22 positioned at its center section for reasons as will hereinafter be explained.

In the space between the inner wall of the drum 2, the flanges 15, and the shaft 20 is mounted a centrifugal blower 23. This blower is held in position with respect to the flanges 15 by the tie rods 19, which pass through end plates 23a of the blower as shown in FIGS. 5 and 6.

The flanges 15 are held in position in relation to the drum 2 by means of projections or keys such as key 24 shown in FIG. 6.

When the drum assembly is rotated about the fixed shaft 20, the blades of the blower 23 draw air through the passage 25 of the shaft 20 and thence through the slots 22. When the air comes in contact with the blades of the turbine, it is impelled by centrifugal force through the slots 6 of the drum 2 and escapes through the gaps between the edges of the plates 10 and the cutting blades 3, carrying with it any waste material which is present.

FIGS. 6 and 7 illustrate an embodiment analogous to that described in connection with FIG. 5. In this embodiment the slots 6 which permit the passage of compressed air to the spaces between the cutting blades are replaced by holes 26 spaced at regular intervals along the surface of the drum 2.

In the preceding description, the slots 6 or the holes 26 are machined so as to be perpendicular to the tangent passing through the intersection of the axis of the groove or hole with the inner wall of the drum 2. Alternatively, as shown in FIG. 8, the holes or slots can be made so that the axis thereof is disposed at an angle with respect to the tangent passing through the intersection of the axis of the slot or hole with the inner wall of the drum 2, so that the angle α has a value other than 90°.

As is shown in FIG. 9, the openings of the grooves 6 between the cutting blades 3 can be V-shaped in form, with the point of the V disposed toward the bottom of the groove. Conversely, the exits of the holes 26 may have a tapered form (not shown).

As may also be seen from FIG. 9, the plates 10 may have a shallow V-shape in cross section, the apex at the V being disposed downwardly toward the grooves or holes.

In FIG. 10 there is shown another form of ejector element in the form of a rod 27 having a circular cross section. Of course, the rod 27 could be of any cross sectional shape which yields the desired flexibility and mechanical strength.

FIG. 11 is a perspective view of an assembled cutting apparatus in conformity with the invention. In this apparatus there is provided a base member 35 which has mounted thereon a pair of parallel rails 29, one of which is shown in FIG. 11. Slidably mounted on rails 29 are a pair of bearing blocks 34 which rotatably support the respective ends of shaft 30 on which support drum 1 is mounted Longitudinal positioning of the support drum 1 relative to the base 35 is accomplished by means of threaded adjustment members 31 coactive between the base 35 and the blocks 34. Similarly, blocks 32 are slidably mounted on rails 29 and support respective ends of shaft 20 of the cutting drum 2. Longitudinal positioning in the cutting drum 2 is accomplished by threaded adjusting members 33.

Hingedly secured to the base 35 by means of the shaft 37 are a pair of arms 38. Fixed to the arms 38 is a protective cover 36. A compression roll 28 is rotatably mounted between the arms 38. The arms 38 are held in position during operation by the spring 39 which is affixed at one to the curved handle 38a joining the arms 38.

In operation, roving 5 is drawn into the apparatus in the direction as indicated and is pressed against the support drum 1 by the compression roll 28. The roving 5 is carried to the point of intersection of the knife blades 3 and the surface of support drum 1 and the cut pieces 5a are ejected vertically downwardly out of the apparatus.

Some examples are given below of applications utilizing the above described invention.

EXAMPLE I

Figure 12:
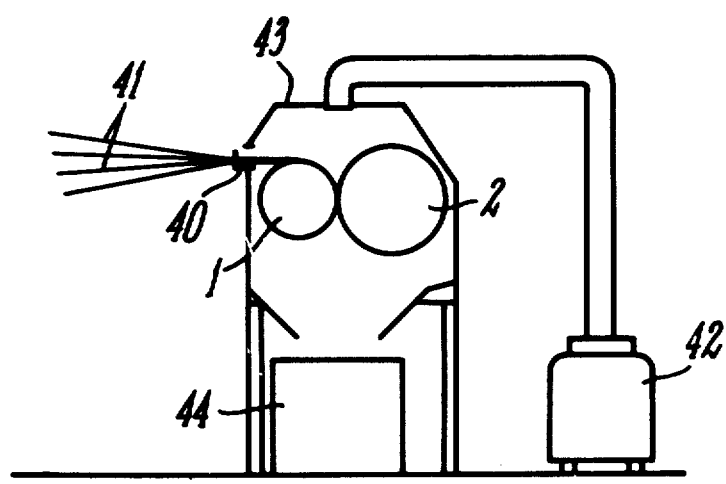
FIGS. 12 and 13 are schematic drawings showing cutting apparatus according to the invention in operating environments, according to Examples I and II respectively, set forth below.

Cut threads are produced, 3—6 mm in length, from glass fiber rovings. The equipment utilized, which is represented schematically in FIG. 12, has a comb 40 used to guide a plurality of rovings 41 onto the support drum 1. An exhaust or vacuum system 42 is connected to the hood or top of the housing 43, which housing encloses the support drum 1 and the cutting drum 2, for reasons as will hereinafter appear. A transverse back and forth motion is imparted to the comb 40 and this in turn causes the rovings to move back and forth over the surface of the drum 1. This reduces wear on the cutting blades and permits them to wear more evenly. The exhaust system 42 carries off the dust and waste material formed by the cutting operations and maintains the air in the working area free of such material.

Rovings are fed to the cutting apparatus from a creel, a number of these rovings being equivalent to 10,000 tex. The equipment is located in an air conditioned environment having a relative humidity of 80–90%, and a temperature of about 18°–20°C. The volume of air drawn off by the exhaust 42 is about 0.1 cubic meters per second.

The cut pieces thus obtained have a low waste content, the waste being removed and evacuated by the compressed air issuing from the cutting drum 2 and the exhaust equipment 42. The products collected in the bin 44 are free of waste material and have an excellent appearance. The situation of pieces being cut more than once, which often occurs when pieces less than 3 mm are being produced, is eliminated by the action of the ejector elements.

During tests, a total of 50 hours or operation was achieved without any interruption for cleaning the cutting drum. After shutdown following the 50 hours of operation, it was found that the cutting drum did not have the slightest trace of textile waste or size deposits.

On this type of equipment, it has been found that shut downs need be made only for the purpose of changing the cutting blades or the rubber jacket of the supporting drum, when these have become worn from use.

EXAMPLE II

Figure 13:
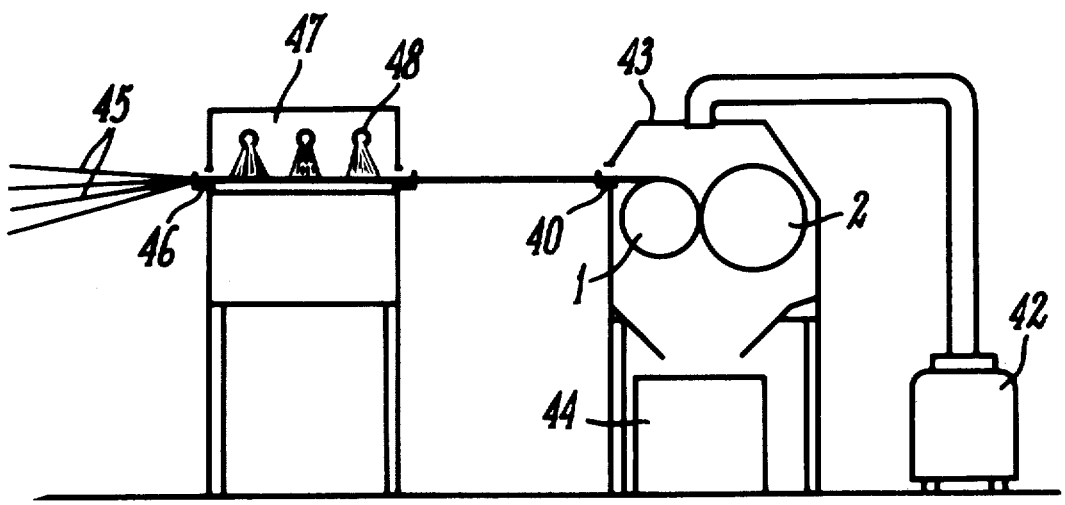

Cuttings of 3–6 mm in length were made from rovings coming from a creel, one roving being equivalent to 10,000 tex. Referring to FIG. 13, the threads of material 45 coming from the spools were guided through rings to a comb 46, over which they were distributed. These threads were passed through an enclosure 47, having a plurality of water sprayers 48 and the threads were given a moisture content equivalent to air saturated with water.

The threads were then passed over a selector comb 40 and drawn into the apparatus comprised of the support drum 1 and the cutting drum 2, this assembly being of the same type as used in Example I. The machinery is likewise equipped with an exhaust or vacuum system 42, as in Example I.

The results with respect to the quality of cut sections, the anti-waste effect of the cutter drum, and the duration of operation are identical to those of Example I.

In these two examples the speed of rotation of the cutting drum was 1,300 rpm, which corresponds to an unwinding speed for the roving to be cut of 500 meters per minute. It is thus possible to obtain a rate of flow, with a roving of 10,000 tex., of 300 kg/hr. of cut thread.

I claim:

1. Apparatus for cutting thread into short lengths comprising, a support element for supporting the thread to be cut, a rotatable cutting drum having a plurality of radially extending cutting blades positioned to engage the support element, means for supplying compressed gas from the interior of the cutting drum to the spaces between adjacent cutting blades for dislodging waste material from said spaces, and ejector means, including elongate ejector elements movable radially outwardly responsive to centrifugal force generated by rotation of the drum and positioned between the cutting blades for compressing the thread against the support element and for ejecting cut sections of thread from between the cutting blades.

2. Apparatus according to claim 1 wherein the means for compressing and ejecting the thread comprises a plurality of flexible plates.

3. Apparatus in accordance with claim 2 wherein portions of the plates are radially movable to positions even with the cutting edges of the cutting blades.

4. Apparatus according to claim 1 wherein the means for compressing and ejecting the thread comprises rods having a circular cross section.

5. Apparatus according to claim 1 wherein the cutting drum is rotatable about a hollow shaft, means in the shaft for allowing gas to pass from the shaft into the interior of the cutting drum, blower means for compressing gas issuing from the shaft, the cutting drum including apertures positioned between adjacent cutting blades for delivering gas from the blower means to the space between the cutting blades, a pair of cover plates, means rotatably mounting the cover plates on the shaft, and means mounting the blower means, the cutting drum, and the ejector means on the cover plates.

6. Apparatus as in claim 1 and further comprising exhaust means adjacent the cutting drum for carrying dislodged waste material away from the cutting drum.

7. A cutting drum for cutting threads into short lengths comprising a drum, a plurality of spaced radially extending cutting blades mounted on the drum, ejector means for stripping cut pieces of thread from the spaces between adjacent cutting blades comprising a plurality of elongate, flexible ejector elements, each one of the elements being positioned in a space between two adjacent cutting blades, and means mounting the ejector elements for radial movement in response to centrifugal forces generated by rotation of the drum, said mounting means including means for securing the ends of the ejector elements on the drum.

8. Apparatus as in claim 7 wherein the members are resilient and curved so that, when the drum is at rest, portions of the members are disposed adjacent the drum and when the drum is rotated at its operating speed the members are urged to a substantially straight condition, level with the cutting edges of the blades, by centrifugal forces generated by the rotating drum.

9. Equipment for cutting thread into short lengths comprising, a cutting drum having spaced, radially projecting cutting blades, a cooperating anvil drum, means for feeding thread between the drums to effect cutting thereof into short lengths, the cooperating drums rotating in opposite directions and delivering the cut lengths vertically downwardly and means for separating waste material from the cutting drum comprising an exhaust system adjacent the cutting drum including a hood disposed over the cutting drum above the region of downward delivery of the cut lengths and means for dislodging waste material from the cutting drum into the exhaust system including supply passages in the cutting drum for supplying gas under pressure to the spaces outwardly between the radially projecting cutting blades.

10. Apparatus for cutting thread into short lengths comprising, a support element for supporting the thread to be cut, a rotatable cutting drum having a plurality of radially extending cutting blades positioned to engage the support element, means for supplying compressed gas from the interior of the cutting drum to the spaces between cutting blades, ejector means positioned between the cutting blades for compressing the thread against the support element and for ejecting cut sections of thread from between the cutting blades, blower means positioned interiorly of the drum and driven by rotation of the drum for compressing the gas and delivering the gas to the supply means.

11. Apparatus according to claim 10 wherein the blower means includes vanes formed by radially inwardly extending portions of at least some of the cutting blades.

12. Apparatus according to claim 10 wherein the blower means comprises a centrifugal blower mounted within the cutting drum.

* * * * *